US012751387B2

(12) United States Patent
Peterson et al.

(10) Patent No.: US 12,751,387 B2

(45) Date of Patent: Oct. 6, 2026

(54) SYSTEMS AND METHODS FOR COUPLING A PLURALITY OF CARTS IN A GROW TOWER SYSTEM

(71) Applicant: Tavaci Technologies LLC, Alpine, UT (US)

(72) Inventors: Sean R. Peterson, Payson, UT (US); Johndavid Tueller, Orem, UT (US); Todd Garrett Tueller, Alpine, UT (US); Ryan Joseph Crawford, Salem, UT (US)

(73) Assignee: Tavaci Technologies LLC, Alpine, UT (US)

( * ) Notice: Subject to any disclaimer, the term of this patent is extended or adjusted under 35 U.S.C. 154(b) by 0 days.

(21) Appl. No.: 18/765,032

(22) Filed: Jul. 5, 2024

(65) Prior Publication Data

US 2025/0008896 A1 Jan. 9, 2025

Related U.S. Application Data

(60) Provisional application No. 63/512,129, filed on Jul. 6, 2023, provisional application No. 63/512,119, filed on Jul. 6, 2023.

(51) Int. Cl.

*A01G 31/04* (2006.01)

*A01G 31/06* (2006.01)

(52) U.S. Cl.

CPC ........... *A01G 31/045* (2013.01); *A01G 31/06* (2013.01)

(58) Field of Classification Search

CPC ..... A01G 31/042; A01G 31/045; A01G 31/06

See application file for complete search history.

(56) References Cited

U.S. PATENT DOCUMENTS 5,567,103 A 10/1996 Konstant
5,822,920 A 10/1998 Tsay (Continued)

FOREIGN PATENT DOCUMENTS

CN 107896748 A * 4/2018 ........... A01G 9/1423
CN 107963572 A * 4/2018 ............ B66F 7/0625

(Continued)

OTHER PUBLICATIONS

International Search Report and Written Opinion mailed on Sep. 25, 2024 for PCT Patent Application No. PCT/US2024/036953.

*Primary Examiner* — Magdalena Topolski

*Assistant Examiner* — Katherine Anne Kloecker

(74) *Attorney, Agent, or Firm* — Thomas | Horstemeyer, LLP

(57) ABSTRACT

The present disclosure presents systems and related methods for coupling a plurality of carts in a modular grow tower. One such system comprises a plurality of body frames positioned vertically, such that each body frame include tracks; carts configured to traverse the tracks, where each cart has a first end with at least one male engagement mechanism and a second end with at least one female engagement mechanism. Accordingly, the male engagement mechanism of a first cart is configured to engage the female engagement mechanism of a second cart in a removable manner. The system further includes lift frames located at opposite ends of the body frames, where each lift frame comprises a plurality of lift mechanisms configured to move the carts in a vertical direction between the tracks of the body frames; and/or a modular grow tower computing device configured to control an operation of the modular grow tower.

17 Claims, 10 Drawing Sheets

(56) References Cited

U.S. PATENT DOCUMENTS

| | | | | |
|---|---|---|---|---|
| 9,908,713 | B2 | 3/2018 | Okazaki et al. | |
| 10,306,847 | B2 | 6/2019 | Whitcher et al. | |
| 10,766,698 | B2 * | 9/2020 | Lindbo | A62C 99/0018 |
| 10,913,622 | B2 * | 2/2021 | Stott | B60M 1/302 |
| 11,647,705 | B2 * | 5/2023 | Schneider | E02D 31/00 47/48.5 |
| 11,849,685 | B2 * | 12/2023 | Travaglini | F24F 7/08 |
| 12,069,993 | B2 * | 8/2024 | Kaplita | A01G 9/023 |
| 12,246,917 | B2 * | 3/2025 | Ambrosi | B65G 1/0407 |
| 12,262,667 | B2 * | 4/2025 | Kivioja | A01G 31/06 |
| 12,268,137 | B2 * | 4/2025 | Storey | A01G 31/06 |
| 12,484,490 | B2 * | 12/2025 | Arias | A01G 9/14 |
| 2002/0046696 | A1 | 4/2002 | Lang | |
| 2003/0116068 | A1 | 6/2003 | Sauder et al. | |
| 2006/0037520 | A1 | 2/2006 | Tsing | |
| 2006/0278726 | A1 | 12/2006 | Holly | |
| 2011/0271887 | A1 | 11/2011 | Shoup | |
| 2018/0235156 | A1 | 8/2018 | Blair et al. | |
| 2018/0305123 | A1 | 10/2018 | Lert et al. | |
| 2018/0359948 | A1 | 12/2018 | Millar et al. | |
| 2019/0208722 | A1 | 7/2019 | Fevre et al. | |
| 2020/0037524 | A1 | 2/2020 | Friedman | |
| 2020/0039755 | A1 | 2/2020 | Millar et al. | |
| 2020/0154647 | A1 | 5/2020 | Millar et al. | |
| 2020/0236883 | A1 | 7/2020 | Ambrosi et al. | |
| 2021/0007301 | A1 | 1/2021 | Do | |
| 2022/0009715 | A1 | 1/2022 | Rongley | |
| 2022/0201926 | A1 | 6/2022 | Bertram et al. | |
| 2022/0221328 | A1 | 7/2022 | Coffin | |
| 2022/0256790 | A1 | 8/2022 | Kaplita et al. | |
| 2024/0040970 | A1 * | 2/2024 | Zalusky | A01G 9/027 |

FOREIGN PATENT DOCUMENTS

| | | | | | |
|---|---|---|---|---|---|
| CN | 209310900 | U | | 8/2019 | |
| CN | 212164498 | U | | 12/2020 | |
| CN | 112806186 | A | | 5/2021 | |
| IL | 290012 | B1 | | 6/2023 | |
| JP | 3174418 | U | | 3/2012 | |
| KR | 100850684 | B1 | * | 8/2008 | A01G 9/143 |
| KR | 101643553 | B1 | * | 7/2016 | A01G 9/143 |
| KR | 101849161 | B1 | | 4/2018 | |
| KR | 102514289 | B1 | | 3/2023 | |
| WO | 2014182600 | A1 | | 11/2014 | |
| WO | 2022241505 | A1 | | 11/2022 | |
| WO | 2022242531 | A1 | | 11/2022 | |

* cited by examiner

SYSTEMS AND METHODS FOR COUPLING A PLURALITY OF CARTS IN A GROW TOWER SYSTEM

CROSS-REFERENCE TO RELATED APPLICATION

This application claims priority to co-pending U.S. provisional application entitled, "Systems and Methods for Coupling a Plurality of Carts in a Grow Pod System," having application number 63,512,119, filed Jul. 6, 2023, and U.S. provisional application entitled, "Systems and Methods for Providing a Modular Grow Pod," having application No. 63/512,129, filed Jul. 6, 2023, each of which is entirely incorporated herein by reference.

TECHNICAL FIELD

Embodiments described herein generally relate to systems and methods for coupling a plurality of carts in a modular grow tower system.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

SUMMARY

The present disclosure presents systems and related methods for coupling a plurality of carts in a modular grow tower. One such system comprises a plurality of body frames positioned vertically, each body frame including a plurality of tracks; a plurality of carts configured to traverse the tracks, each cart having a first end with at least one male engagement mechanism and a second end with at least one female engagement mechanism, wherein the male engagement mechanism of a first cart is configured to engage the female engagement mechanism of a second cart in a removable manner; a plurality of lift frames located at opposite ends of the body frames, each lift frame comprising a plurality of lift mechanisms configured to move the carts in a vertical direction between the tracks of the body frames; and/or a modular grow tower computing device configured to control an operation of the body frames, lift frames, translating mechanisms, cart path, cart movement, and crop growth conditions.

Also disclosed herein is a method comprising positioning a plurality of body frames vertically, each body frame having a plurality of tracks; configuring a plurality of carts to traverse the tracks, each cart having a first end with at least one male engagement mechanism and a second end with at least one female engagement mechanism; engaging the male engagement mechanism of a first cart with the female engagement mechanism of a second cart; utilizing a plurality of lift frames located at opposite ends of the body frames, each lift frame having a plurality of lift mechanisms to move the carts in a vertical direction between the tracks of the body frames; and/or controlling an operation of the body frames, lift frames, lift mechanisms, translating mechanisms, cart path, cart movement, and crop growth conditions, and carts with a modular grow tower computing device.

In one or more aspects, such systems and/or methods involve each translating mechanism having a plurality of motorized apparatuses configured to push or pull the carts in a longitudinal direction; moving the carts in a serpentine moving path from a top end to a bottom end of the modular grow tower; decoupling the carts by moving the carts in a vertical direction; and/or positioning a plurality of translating mechanisms along a length of each track, each translating mechanism having a plurality of motorized apparatuses configured to push or pull the carts in a longitudinal direction.

In one or more aspects of such systems and methods, the tracks are configured to support the carts such that the carts traverse the tracks in a moving path from a top end to a bottom end of the modular grow tower; the moving path comprises a serpentine moving path; the male engagement mechanism comprises a protrusion and the female engagement mechanism comprises a notch, the male engagement mechanism being configured to engage the female engagement mechanism by moving the first cart in a first horizontal direction, and to disengage by moving in a second horizontal direction opposite the first horizontal direction; the lift mechanisms are further configured to decouple the carts by moving the carts in a vertical direction; each track of the body frames includes a plurality of track floors spaced apart in a vertical direction, the carts being configured to engage with the tracks and traverse in a longitudinal direction while being restricted from lateral movement; the motorized apparatuses include a latch configured to releasably secure to the carts, the motorized apparatuses being extendable and retractable to move the carts a predetermined length; and/or engaging the male engagement mechanism with the female engagement mechanism comprises moving the first cart in a first horizontal direction to engage, and/or moving in a second horizontal direction opposite the first horizontal direction to disengage.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for coupling a plurality of carts in a modular grow tower system. The plurality of carts may include a plurality of engagement mechanisms, such that the plurality of carts may be removably coupled to adjacent carts. In various embodiments, the plurality of carts may be removably coupled such that the carts may be disengaged from their adjacent carts in a vertical direction.

Figure 1:
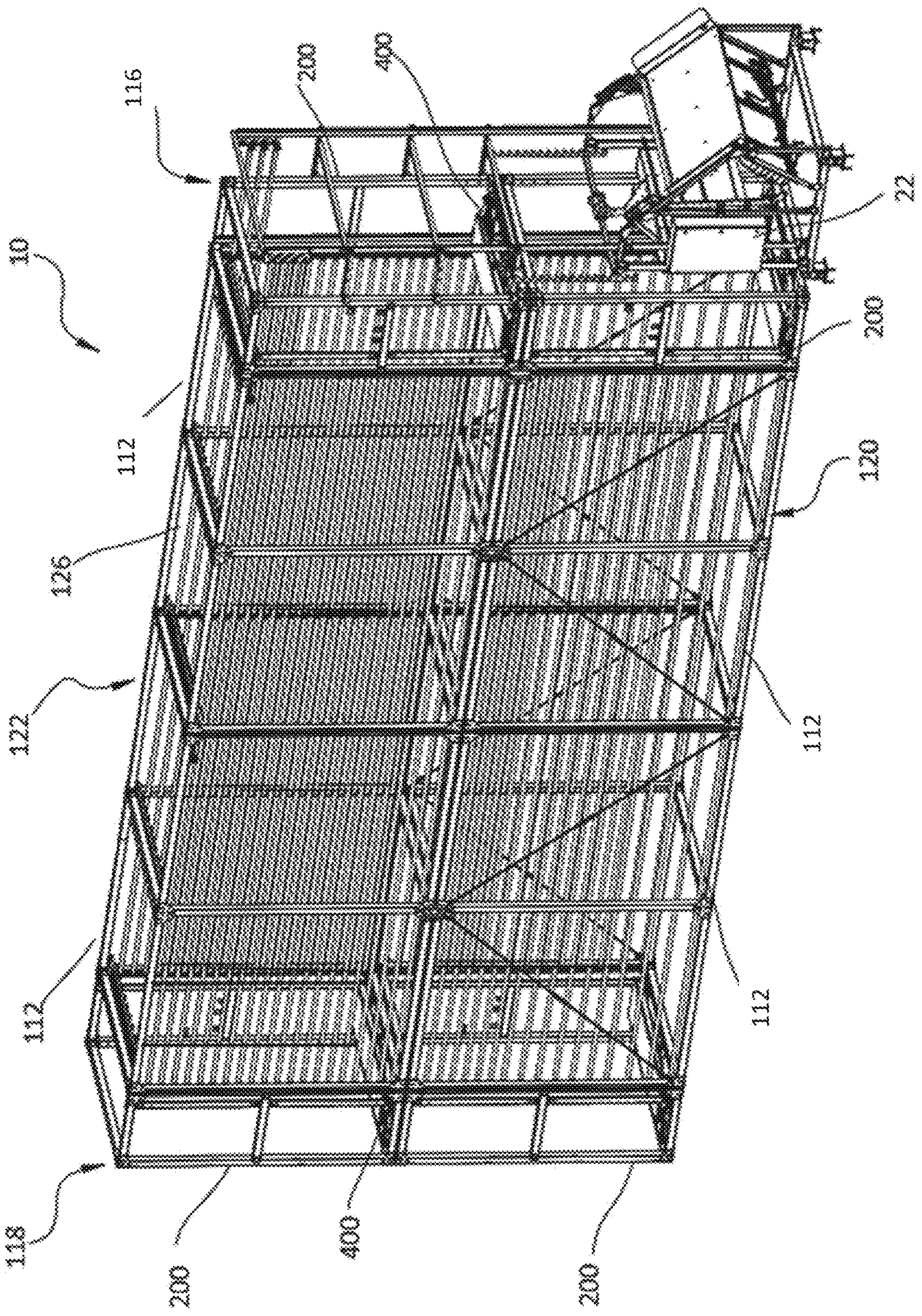
FIG. 1 schematically depicts a modular grow tower according to one or more embodiments shown and described herein.

Referring to the drawings, FIG. 1 schematically depicts a modular grow tower 10, according to one or more embodiments shown and described herein. As illustrated, the modular grow tower 10 may include a plurality of body frames 112 and a plurality of lift frames 200. The plurality of lift frames may be located on a first end 116 and a second end 118 of the modular grow tower 10, and the plurality of body frames 112 may be positioned between the plurality of lift frames 200. As illustrated in FIG. 1, the plurality of lift frames 200 and body frames 112 may be stacked in a vertical direction such that the plurality of lift frames 200 and body frames 112 create a plurality of rows. Also depicted in FIG. 1 is a modular grow tower computing device 22, which may be configured for controlling various components of the modular grow tower 10.

In various embodiments, the modular grow tower assembly and constituent lift frames and body frames can comprises a variety of materials, such as, but not limited to, aluminum alloys, titanium alloys, carbon fiber reinforced polymer (CFRP), glass fiber reinforced polymer (GFRP), high-strength low-alloy (HSLA) steel, stainless steel, bamboo, composite materials (hybrid), engineered wood products (e.g., cross-laminated timber (CLT)), high-strength thermoplastics (e.g., polycarbonate, polyether ether ketone (PEEK)).

Figure 2:
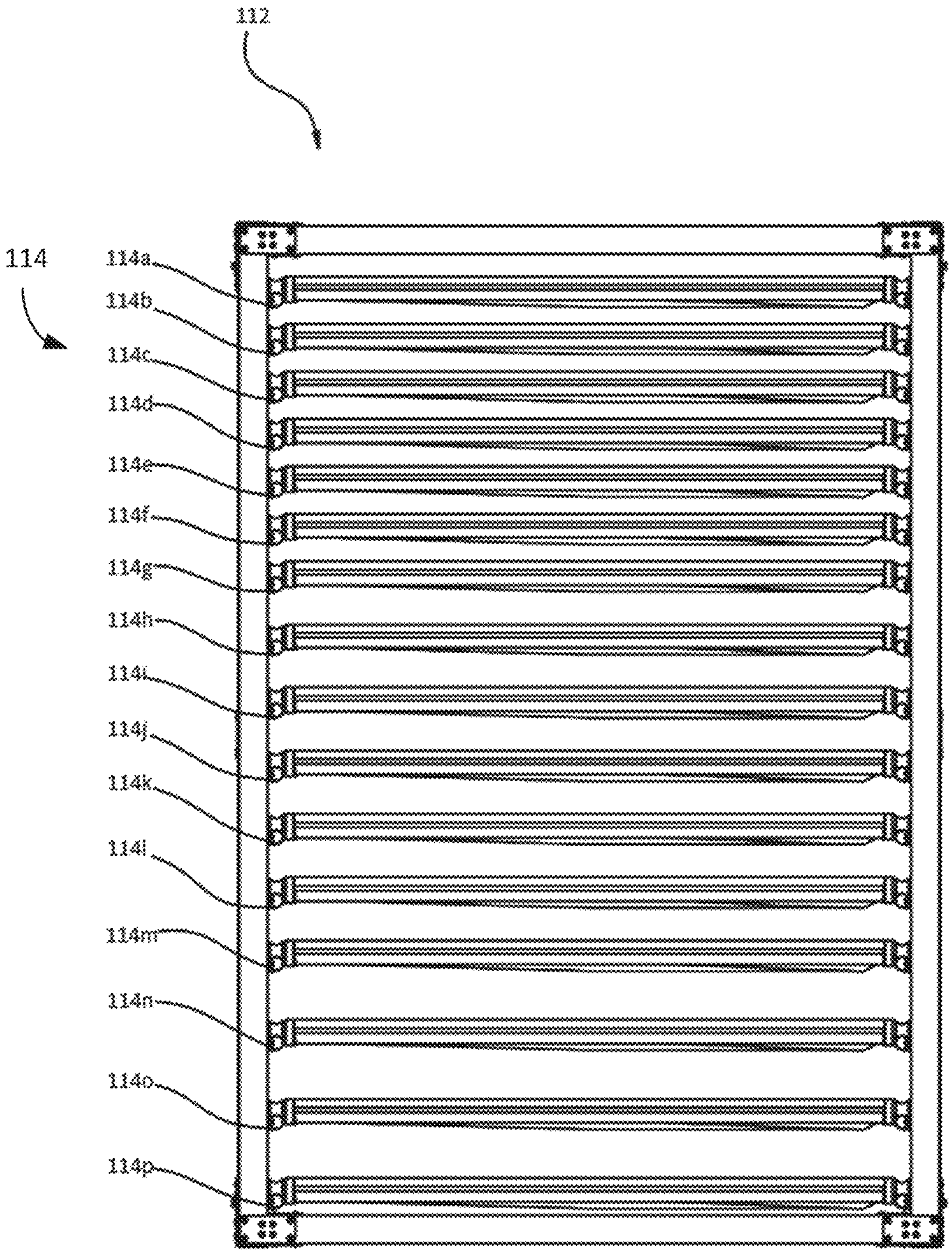
FIG. 2 schematically depicts a front view of a body frame of the modular grow tower of FIG. 1 according to one or more embodiments shown and described herein.

FIG. 2 schematically depicts a front view of a body frame of the modular grow tower, according to one or more embodiments shown and described herein. As illustrated, the plurality of body frames 112 may include a plurality of tracks 114. The tracks 114 may include a plurality of track floors 114*a*-114*p* of the modular grow tower 10. The track floors 114*a*-114*p* may be spaced apart from one another in the vertical direction. While in the embodiment depicted in FIG. 2, the tracks 114 are depicted as having a cylinder-shape, it should be understood that this is merely an example, and the tracks 114 can have any suitable shape.

Referring now to FIGS. 1 and 2, the plurality of body frames 112 may be configured to support a plurality of carts 300 (FIG. 3), which may traverse the modular grow tower 10 in a moving path (e.g., serpentine moving path, circular moving path, curved or straight moving path, etc.) from a top end 122 of the modular grow tower 10 to a bottom end 120 of the modular grow tower 10. The plurality of carts 300 may be configured to engage the tracks 114 such that the carts 300 may traverse the tracks 114 in a longitudinal direction. Once the carts 300 have traversed the length of the track 114, the lift frames 200 may further comprise a plurality of lift mechanisms 400 which may be configured to move the carts 300 in a vertical direction between the multiple track floors 114*a*-114*p*.

Figure 3:
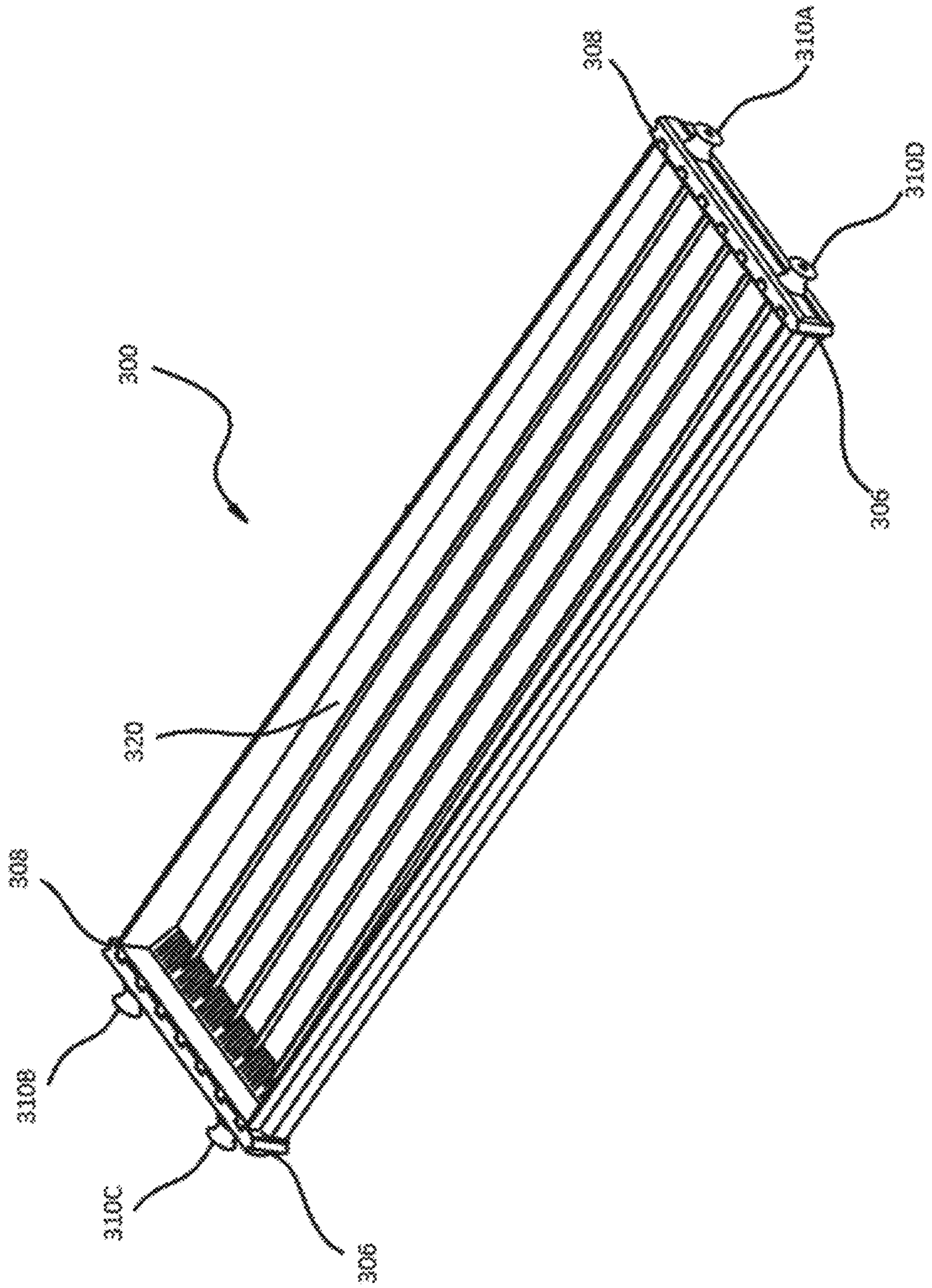
FIG. 3 depicts a perspective view of a cart for receiving crops in the modular grow tower of FIG. 1 according to one or more embodiments shown and described herein.

FIG. 3 depicts a perspective view of a cart for receiving crops in the modular grow tower of FIG. 1, according to one or more embodiments shown and described herein. Crops may include traditional agricultural materials, for example, seeds and plants, as well as non-traditional materials, for example, eggs, algae, insects, insect larvae, fungi, other kinds of organic material, and/or the like. As illustrated, the cart 300 may include a tray 320, such as a foam reinforced thermoformed tray, which may be configured to support a quantity of crops. A plurality of wheels 310A, 310B, 310C, and 310D may be coupled to the tray 320 for supporting the crops as the carts 300 traverse the moving path of the modular grow tower 10. In some embodiments, the plurality of wheels 310*a*, 310*b*, 310*c*, and 310*d* may be configured to engage with the plurality of tracks 114 of the body frames 112, such that the carts 300 are capable of traversing the tracks 114 in a longitudinal direction. Additionally, the engagement of the plurality of wheels 310A, 310B, 310C, 310D with the tracks 114 may restrict the carts 300 from moving in a lateral direction.

In various embodiments, the moving path may take various shapes. For example, the moving path may comprise a serpentine path, such as one that starts from the top, moving trays horizontally in one direction, then down one sequential row as they reach the end of the horizontal path. The trays then move in the opposite horizontal direction along the new row, then down another row to continue the same pattern, and so forth. Alternatively, in various embodiments, the moving path may comprise a C-Shape path, such that carts may move horizontally in one direction on the top half of the total rows, then down to the bottom half of the total rows where the lighting system may be located. The carts may then move horizontally in the opposite direction, being harvested at the bottom. Correspondingly, in some embodiments, the moving path may comprise alternating rows/skipping rows path such that carts may move from row A to row C and then, subsequently, carts may move from row B to row D, instead of A to B to C to D in sequence. Further, in various embodiments, the moving path may having batching collections of rows such that groups of rows may be set and left without movement for many days and then all moved to a new set of rows with different heights or systems in one rapid succession. For example, rows A, B, C, and D may be batched to be moved on the same day to rows I, J, K, and L, while rows E, F, G, and H remain stationary until the following day. Additionally, in various embodiments, the moving path may comprise a haphazard path such that carts from the top rows can be moved down to any of the lower rows where different systems such as nutrients, lighting, watering, and measuring are located, and then moved back up again to the same row of origin or another row, offering full versatility.

Referring still to FIG. 3, the cart 300 may include a first end and a second end. In some embodiments, the first end and second end may each include an engagement mechanism which is configured to allow the cart 300 to engage with other carts 300. For example, the first end of the cart 300 may include at least one male engagement mechanism 306 and the second end of the cart 300 may include at least one female engagement mechanism 308. The male engagement mechanism 306 may be configured to engage the female engagement mechanism 308 of an adjacent cart 300, such that each of the plurality of carts 300 may remain in contact as the carts 300 traverse the serpentine moving path of the modular grow tower 10. In some embodiments, the female engagement mechanism 308 may comprise a notch, while the male engagement mechanism 306 may comprise a protrusion. In various embodiments, the female engagement 308 may comprise a triangular notch and the male engagement mechanism may comprise a triangular protrusion. However, it should be noted that the male and female engagements mechanisms 306, 308 may take any shape or form, so long as the engagement mechanisms 306, 308 are capable of mating with one another in a flush manner.

The male engagement mechanism 306 and female engagement mechanism 308 of the carts 300 may be further configured such that the carts 300 may be coupled together in a removable fashion. For example, the male engagement mechanism 306 of a first cart 300 may be configured to removably engage the female engagement mechanism 308 of a second cart 300 by moving the first cart 300 in a first horizontal direction such that the male engagement mechanism 306 of the first cart 300 is received by the female engagement mechanism 308 of the second cart 300. Once the male engagement mechanism 306 of the first cart 300 is received by the female engagement mechanism 308 of the second cart 300, the first cart 300 and second cart 300 may be decoupled by moving the first cart 300 in a second horizontal direction opposite the first horizontal direction. As the first cart 300 is moved in the second horizontal direction, the male engagement mechanism 306 of the first cart 300 will disengage the female engagement mechanism 308 of the second cart 300, thereby decoupling the carts 300.

In one embodiment, the first cart 300 and second cart 300 may also be decoupled by moving the first cart 300 and/or second cart 300 in a vertical direction. For example, once the male engagement mechanism 306 of the first cart 300 has engaged the female engagement mechanism 308 of the second cart 300, the carts 300 may be decoupled by moving the first cart 300 and/or second cart 300 in a vertical direction. As the first and/or second cart 300 is moved in the vertical direction, the male engagement mechanism 306 of the first cart 300 may slide along an interior surface of the female engagement mechanism 308 of the second cart 300 until the first and/or second cart 300 has been moved sufficiently in the vertical direction such that the male engagement mechanism 306 of the first cart 300 and the female engagement mechanism 308 of the second cart 300 are no longer physically in contact.

Figure 4:
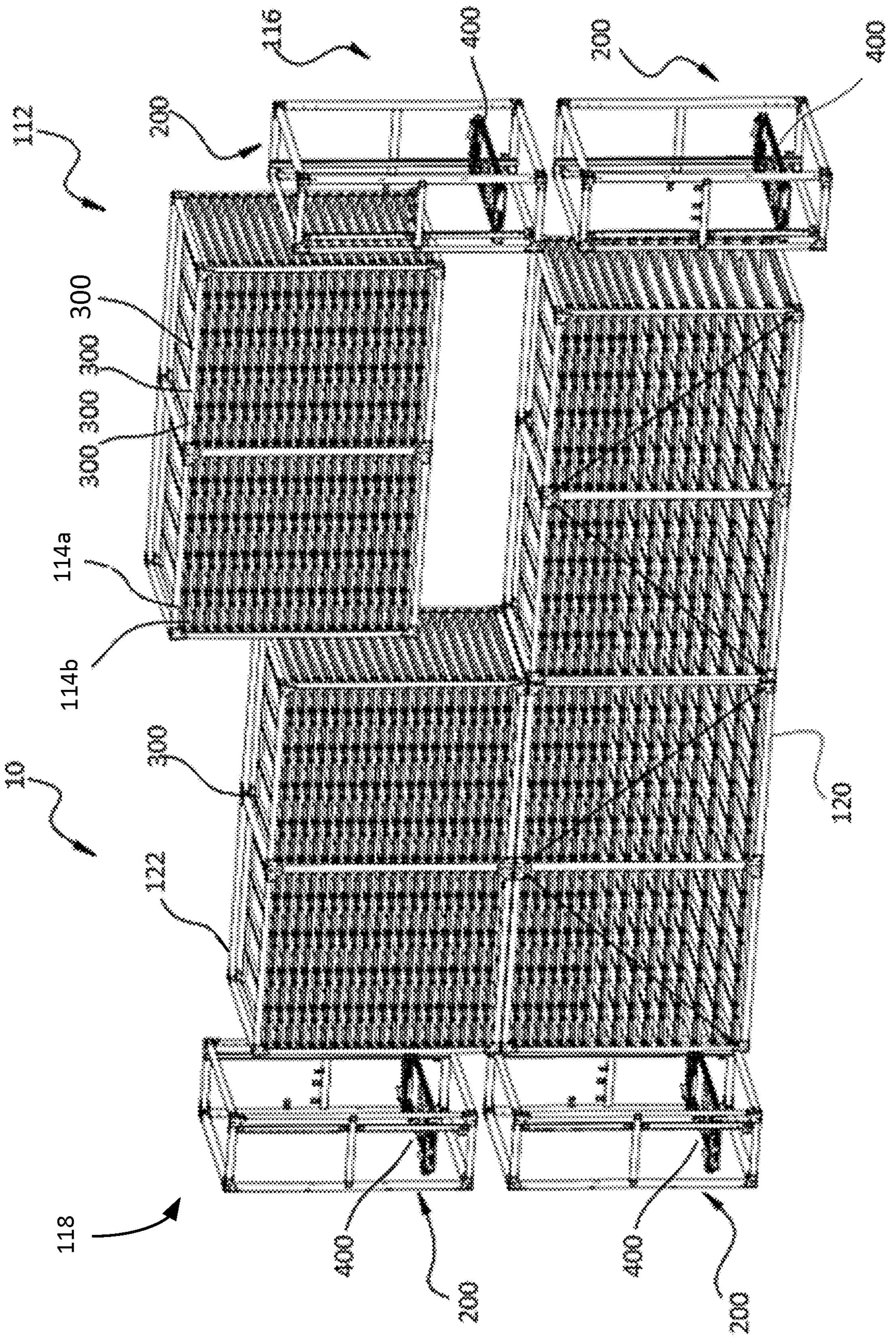
FIG. 4 depicts a partially exploded view of the modular grow tower of FIG. 1 including the positioning of the plurality of carts on the body frames according to one or more embodiments shown and described herein.
Figure 5A:
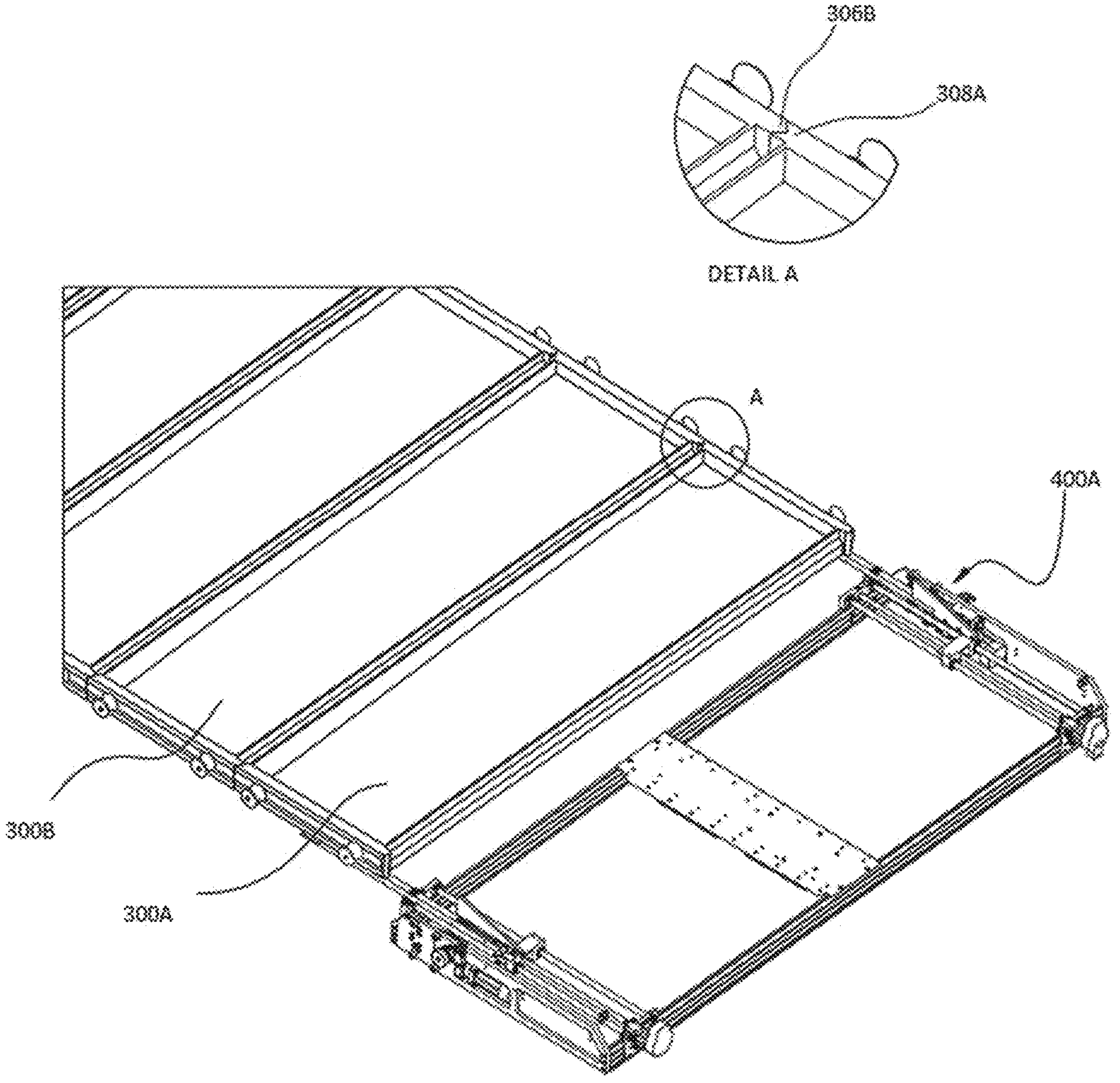
FIGS. 5A-5D depict a plurality of carts being coupled and decoupled as the carts traverse the modular grow tower of FIG. 1 according to one or more embodiments described herein.
Figure 5B:
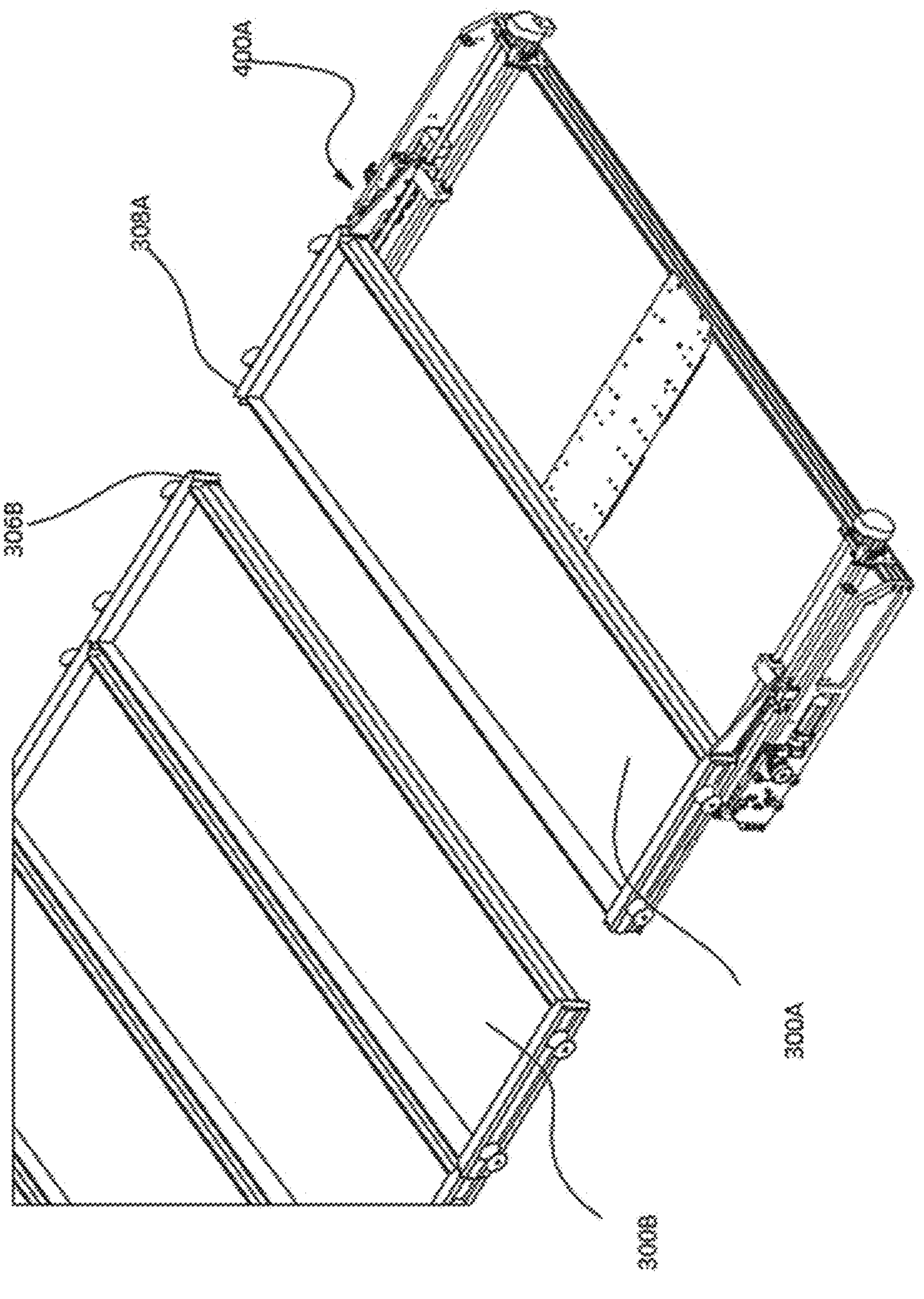
Figure 5C:
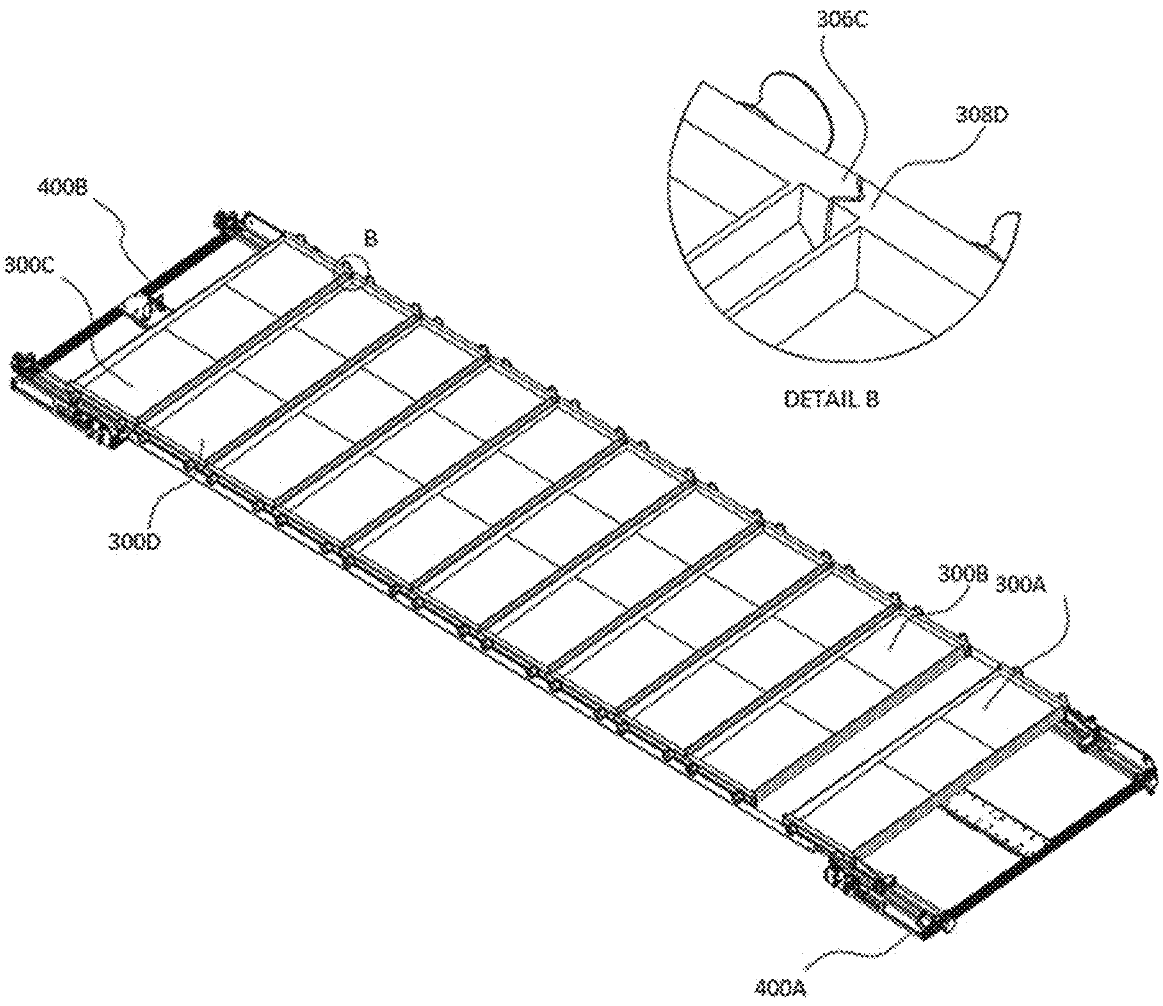
Figure 5D:
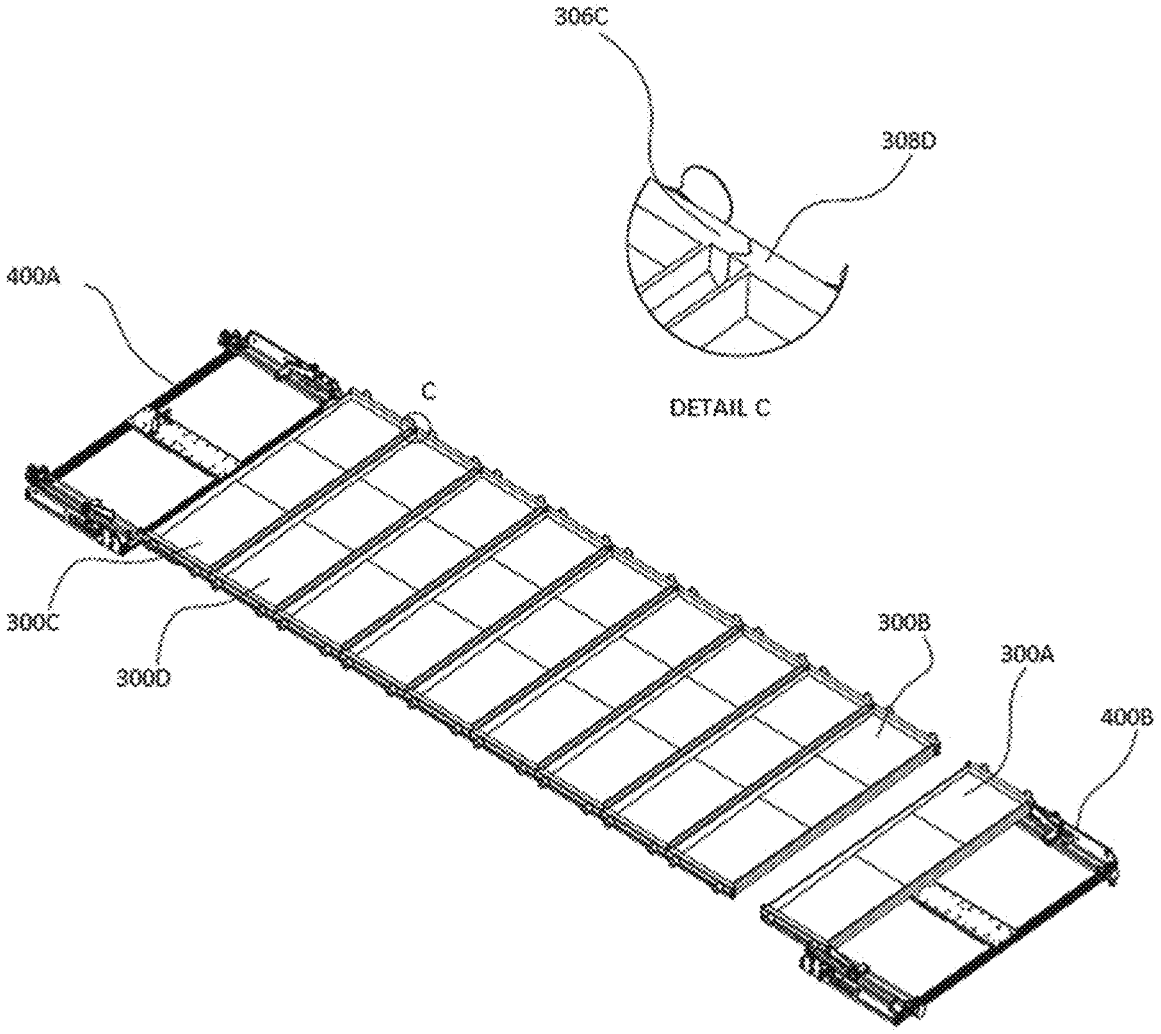

FIG. 4 depicts a partially exploded view of the modular grow tower of FIG. 1 including the positioning of the plurality of carts on the body frames, according to one or more embodiments shown and described herein. As illustrated, the plurality of carts 300 may be positioned on the plurality of tracks 114 of the body frames 112. The plurality of carts 300 are positioned on the tracks 114 such that the male and/or female engagement mechanism 306, 308 of each cart 300 is engaged with the male and/or female engagement mechanism 306, 308 of each adjacent cart 300 on each track floor 114*a*-114*p*. In this configuration, by applying a horizontal force, such as a pushing or pulling force, to the cart 300 positioned on the first end 116 or second end 118 of each track floor 114*a*-114*p* in a longitudinal direction, each cart 300 positioned on the track floor 114*a*-114*p* may be moved in a longitudinal direction by a distance corresponding to the distance by which the cart positioned at the first end 116 or second end 118 is moved.

In some embodiments, the lift mechanisms 400 may be configured to extend and retract, such that the lift mechanisms 400 may be capable of supplying a pushing and/or pulling force on the plurality of carts 300 positioned on the plurality of tracks 114 of the body frames 112. In various embodiments, the lift mechanisms 400 may be configured to retract to a retracted position within the lift frames 200 and extend to an extended position within the body frames 112 such that the lift mechanisms 400 may push a cart 300 from the lift frame 200 and onto the plurality of tracks 114 of the body frames 112 and/or pull a cart 300 from the plurality of tracks 114 and into the lift frames 200.

In various embodiments, the lift mechanisms 400 may be powered via pneumatic arms and/or motors, such as a plurality of translating mechanisms positioned along a length of a track, where each translating mechanism has a plurality of motorized apparatuses (e.g., motors) configured to push or pull the carts in a longitudinal direction. Correspondingly, the motorized apparatuses may be configured to push and retrieve the carts using extendable and retractable mechanical mechanisms to move the carts a predetermined length. In various embodiments, such motorized apparatus may be comprise one or more of motors, belts, chains, rollers, tracks, conveyers, rack and pinion gears, hydraulic systems, pneumatic systems, linear actuators, screw jacks, winches, cables and pulleys, gear systems, cam mechanisms, scissor lifts, and/or magnetic levitation systems.

FIGS. 5A-5D depict a plurality of carts being coupled and decoupled as the carts traverse the modular grow tower of FIG. 1, according to one or more embodiments described herein. As illustrated, a first lift mechanism 400A may pull a cart 300A from a second end 118 of track floor 114*a* and into the corresponding body frame 112. In order to pull the cart 300A from the track floor 114*a* and into the lift frame 200, the lift mechanism 400A must first detach the cart 300A from the remaining plurality of carts 300 positioned on track floor 114*a*. To detach the cart 300A from the remaining plurality of carts 300, the lift mechanism 400A may extend such that it engages the wheels 310 of the cart 300A. With the wheels 310 engaged, the lift mechanism 400A may then retract to the retracted position such that the cart 300A moves in a longitudinal direction away from the remaining plurality of carts 300 positioned on the track floor 114*a*. As the first lift mechanism 400A retracts in the longitudinal direction, the female engagement mechanism 308A of the cart 300A may disengage the male engagement mechanism 306B of an adjacent cart 300B, thereby decoupling the cart 300A from the remaining plurality of carts 300.

Additionally, the lift mechanism 400A may be configured to decouple the cart 300A from the remaining plurality of carts 300 by moving the cart 300A in a vertically upward direction. As the lift mechanism 400A lifts the cart 300A in the vertically upward direction, the female engagement mechanism 308A may slide along an exterior portion of the male engagement mechanism 308B of adjacent cart 300B until the cart 300A is no longer in contact with the adjacent cart 300B. At this point, the cart 300A may be pulled into the lift frame 200. Although it is contemplated that the lift mechanism 400A may be configured to move the cart 300A in either a longitudinal or vertical direction, it should be noted that embodiments which involve the lift mechanism 400A moving the cart 300A in both a vertical and longitudinal direction are also contemplated.

Once the first lift mechanism 400A has pulled the cart 300A into the corresponding lift frame 200, a second lift mechanism 400B may push a new cart 300C onto the first end 116 of track floor 114*a*. As the second lift mechanism 400B pushes the new cart 300C onto track floor, the cart 300C may move in a longitudinal direction towards the plurality of carts 300 positioned on the track floor 114*a*. In one embodiment, the male engagement mechanism 306C of the new cart 300C may engage the female engagement mechanism 308D of adjacent cart 300D. The second lift mechanism 400B may be configured to continue to push the new cart 300C after the male engagement mechanism 306C of the cart 300C has engaged the female engagement mechanism 308D of the adjacent cart 300D, such that the pushing force translated between the male engagement mechanism 306C and female engagement mechanism 308D creates a domino effect which pushes each of the remaining plurality of carts 300 positioned on the track floor 114*a* in the longitudinal direction.

Although the plurality of carts 300 may be positioned along the tracks 114 such that each cart 300 positioned on a particular track floor 114*a*-114*p* may move together in unison, other embodiments disclosed herein may involve moving the plurality of carts 300 individually. In one embodiment, each of the plurality of carts 300 may be decoupled from each of its adjacent carts 300 and moved individually in a longitudinal direction across the tracks 114. In various embodiments, the lifting mechanisms 400 may remain stationary within the lift frames 200, such that additional mechanisms are required to supply the pushing and/or pulling forces required to move the plurality of carts 300 throughout the modular grow tower 10.

Figure 6:
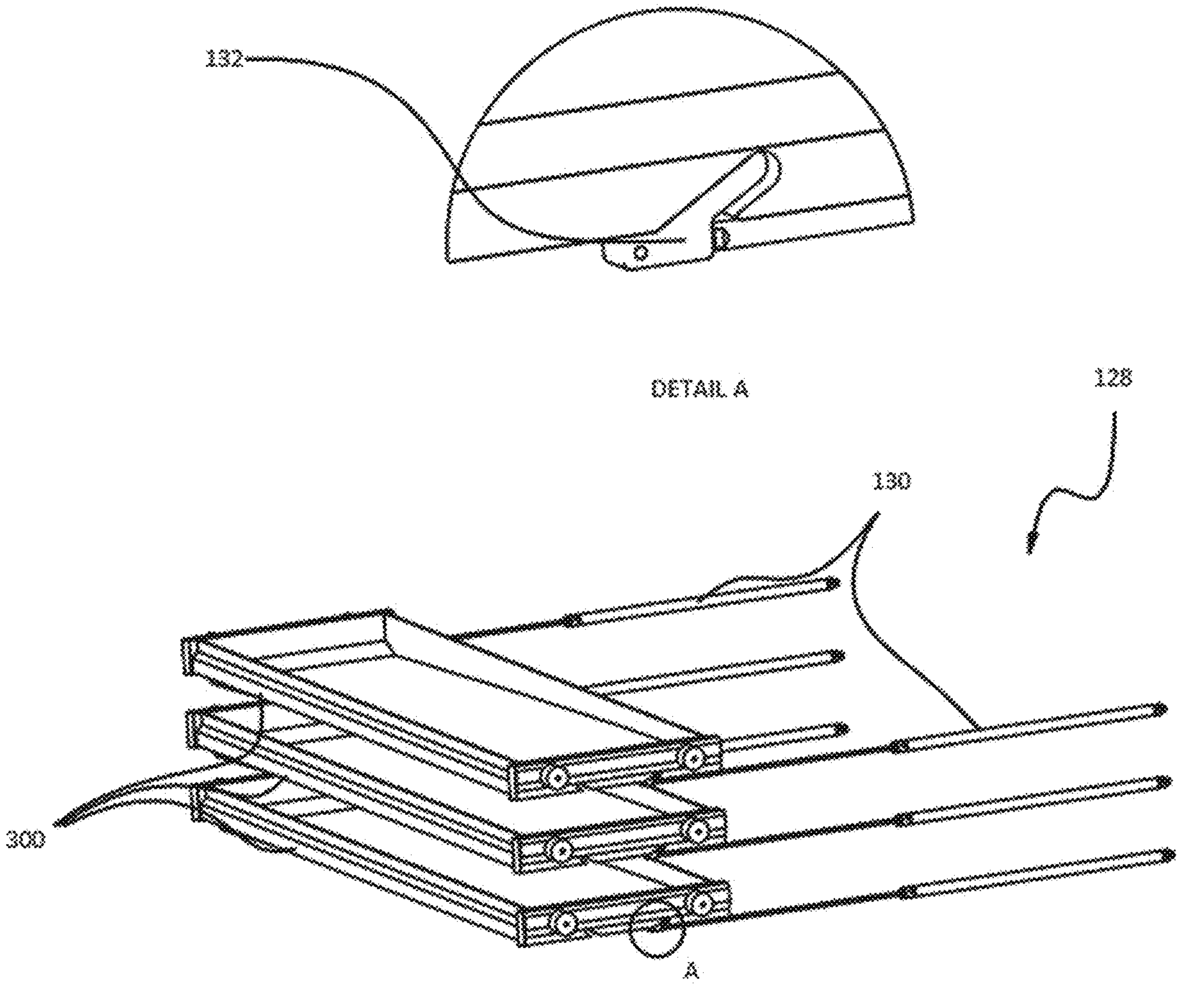
FIG. 6 depicts a mechanism for removing a cart from a lifting mechanism according to one or more embodiments shown and described herein.

FIG. 6 depicts a mechanism for removing a cart from a lifting mechanism 400, according to one or more embodiments shown and described herein. In various embodiments, the tracks 114 may further comprise a plurality of translating mechanisms 128 having a plurality of arms, such as pneumatic arms, 130. Each of the plurality of pneumatic arms 130 may include a latch 132 which may be configured to latch onto the plurality of carts 300. Furthermore, each of the plurality of pneumatic arms 130 may be configured to achieve an extended position and a retracted position. In some embodiments, the pneumatic arms 130 may be positioned at an extended position having a length which is the equivalent of the length of one cart 300, such that the pneumatic arms 130 are capable of moving the plurality of carts 300 a single cart length by actuating between the extended position and the retracted position. However, it should be noted that the pneumatic arms may be configured to extend to any desired length in an extended position.

In some embodiments, translating mechanisms 128 may be provided on the first and/or second ends 116, 118 of the modular grow tower 10. In one embodiment, the pneumatic arms 130 of the translating mechanisms 128 may extend across the tracks 114 of the body frames 112 to engage a cart 300 which is located on the lift mechanism 400 positioned in the lift frame 200 at either the first end 116 or second end 118 of the modular grow tower 10. In various embodiments, the pneumatic arms 130 may be configured to push a cart 300 into the lift frame 200 and/or pull a cart 300 from the lift frame 200 and onto the track 114.

For example, the pneumatic arms 130 may be configured to pull a cart 300 from the lift frame 200 and onto the track 114. Initially the pneumatic arms 130 may extend into the lift frame 200, and the latch 132 may be releasably secured to the cart 300 such that the cart 300 will move in unison with the pneumatic arms 130. With the latch 132 engaged, the pneumatic arms 130 may return to the retracted position. As the pneumatic arm 130 returns to the retracted position, the cart 300 may pulled off of the lift frame 200 in a longitudinal direction and into the track 114 of the body frame 112. As the cart 300 is pulled in the longitudinal direction onto the track 114, the male and/or female engagement mechanisms 306, 308 may of the cart 300 may engage the male and/or female engagement mechanism 306, 308 of the adjacent cart positioned on the track 114. The latch 132 may then be released from the cart 300, at which point the cart may be engaged by another of the plurality of translating mechanisms 128.

Additionally, the pneumatic arms 130 of the translating mechanism 128 positioned at the first and/or second ends 116, 118 of the modular grow tower 10 may be configured to push a cart 300 from the track 114 and onto the lift mechanism 400 positioned in the lift frame. In one embodiment, the pneumatic arms 130 may first releasably secure the latch 132 to the cart 300 prior to extending to the extended position. Once the latch 132 is secure, the pneumatic arms 130 may extend to the extended position, thereby pushing the cart 300 from the track 114 and onto the lift mechanism 400 positioned in the lift frame 200. As the pneumatic arms extend, the cart 300 moves in a longitudinal direction, such that the male and/or female engagement mechanism 306, 308 of the cart 300 disengages the male and/or female engagement mechanism 306, 308 of the adjacent cart 300, thereby decoupling the carts 300 prior to the carts 300 being moved between track floors 114*a*-114*p* by the lift mechanism 400.

In addition to providing translating mechanisms 128 at the first end 116 and second end 118 of the modular grow tower 10, a plurality of translating mechanisms 128 may also be provided along the length of each track floor 114*a*-114*p* such that the plurality of carts 300 may be moved individually across the tracks 114. In various embodiments, translating mechanisms 128 may be positioned across the entire length of the track 114, and may be separated in a longitudinal distance by a length corresponding to the length of a single cart 300. In this configuration, the plurality of translating mechanisms 128 may continue to push and/or pull the carts 300 in a longitudinal direction across the track floors 114*a*-114*p* until each cart 300 positioned on a particular track floor 114*a*-114*p* has moved in a longitudinal direction from the lift frame 200 positioned on the first end 116 of the modular grow tower 10, across the track 114 of the body frame 112, and into the lift frame 200 positioned on the second end 118 of the modular grow tower 10, or vice versa. As the plurality of carts 300 are pushed and pulled across the tracks 114 by the translating mechanisms 128, the male engagement mechanisms 306 and female engagement mechanisms 308 of the carts 300 may continually engage and disengage the male and female engagement mechanisms 306, 308 of any adjacent carts 300.

While the present embodiment contemplates utilizing a plurality of translating mechanisms 128 to individually couple and decouple the plurality of carts 300, it should be understood that the translating mechanisms 128 described herein may also be configured such that the translating mechanisms 128 may cause multiple carts 300 to move in unison as a coupled group at the same time, and/or individually at the same time.

As discussed previously, the motion of carts does not need to follow a serpentine path nor is it limited to one set sequence. One possible method of moving carts in a modular grow tower assembly may be alternating which row carts are moved to, in a non-sequential or non-serpentine path. This alternating method only moves carts when necessary, to designated new rows of the modular grow tower assembly, based on specific growing requirements such as crop height, row spacing, lighting elements, nutrient application systems, visual inspections, harvesting, and/or washing. This method optimizes the movement of carts by reducing the overall motion required and consequently minimizing wear on the carts and the need for an extensive motion system.

In various embodiments, the alternating rows method is controlled by a computer program executed by a controller or computing processor that dictates the sequence of cart movements based on specific growing requirements. For instance, the system can start by moving a cart from the top row to row A, and in the next cycle, move another cart from the top row to row B. This sequence can be customized to suit various growing conditions, ensuring that carts are moved efficiently and only when necessary.

Such a method allows for grouping certain rows together and alternating the movement of these groups. For example, the system can alternate between moving carts in rows A, C, and E in one cycle and rows B, D, and F in the next cycle. Another possibility is moving carts from row A to C in one cycle, then only move carts from rows B to D in the next. Another possibility is moving carts from rows A, B, and C to the next level of rows D, E, and F or even to the bottom rows, for the sake of example could be labeled X, Y, and Z. This reduces the overall motion required during an entire grow cycle of a crop from start to finish, thereby lowering the wear on the carts and minimizing the demand on the lift mechanisms.

Another option, in various embodiments, is allowing different rows of carts to be consolidated together into one entirely new row, and another possibility is individual carts can alternately be sent to a different row during a movement cycle. This is particularly useful when rows are spaced at different heights, and therefore accommodate continually growing crops. Another possible benefit is minimizing the cost of lighting systems by only requiring lighting on one or two rows. There are many other reasons to justify providing flexibility of cart paths and allowing consolidating rows. Accordingly, alternating and shuffling carts and rows can be performed in a large variety of ways in accordance with the present disclosure.

In various embodiments, the non-sequential movement of the carts is controlled by a computer program executed by the processor, which dictates the cart movement sequence based on the specific growing requirements. This sequence can be customized in other variations to suit various growing conditions, grow times of different crops, reducing the frequency of cart movements and enhancing system efficiency. Correspondingly, a cart tracking system of sensors can allow the processor to keep track of the location of each cart and monitor the growing properties of the crops inside each cart. In various embodiments, the processor can also be configured to allow users to test and predict different patterns of cart movements to discover optimal cart pathways and patterns.

Figure 7:
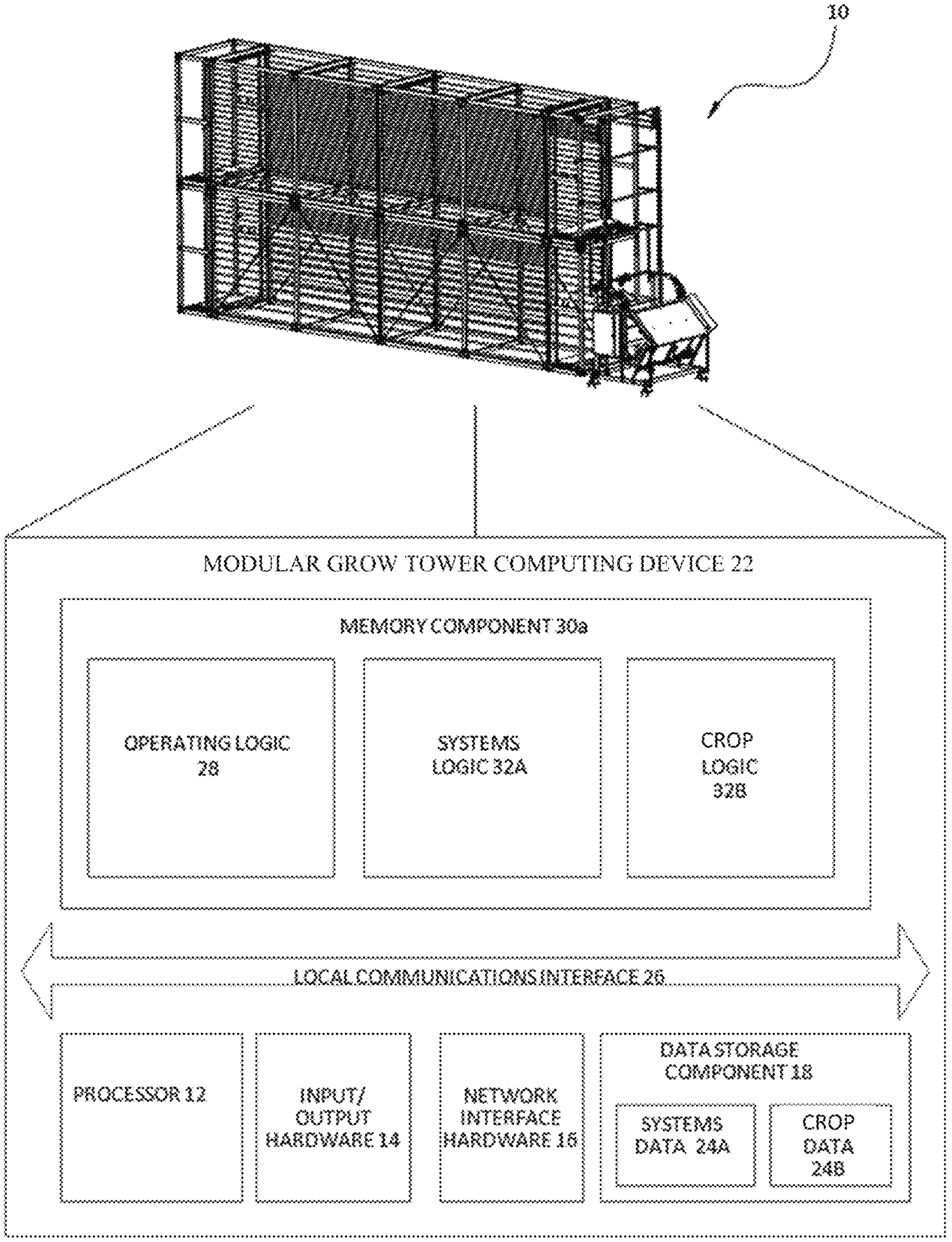
FIG. 7 depicts a modular grow tower computing device according to one or more embodiments described herein.

FIG. 7 illustrates a modular grow tower computing device 22, according to embodiments described herein. As discussed above, the modular grow tower computing device 22 includes a memory component 30*a*, a processor 12, input/output hardware 14, network interface hardware 16, and a data storage component 18 (which stores systems data 24A, crop data 24B, and/or other data). Each of the components of the modular grow tower computing device 22 may be communicatively coupled to a local communications interface 26. The local communications interface 26 is generally not limited by the present disclosure and may be implemented as a bus or other communications interface to facilitate communication among the components of the modular grow tower computing device 22 coupled thereto. The modular grow tower computing device may perform a wide variety of functions for efficient operation of the modular grow tower system including controlling the movement of carts 300 along the tracks 114 using the translating mechanisms 128, controlling vertical movement of the carts 300 between tracks using the lift mechanisms 400, and monitoring and/or adjusting crop growth conditions within the modular grow tower 10. Crop growth conditions are very numerous and may include, for example, temperature, humidity, watering schedules, pH, nutrient administration, light duration, lighting spectrums, and/or the like.

The memory component 30*a* may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), Blu-Ray discs, and/or other types of non-transitory computer-readable mediums. Depending on the particular embodiment, various non-transitory computer-readable mediums may reside within or outside the modular grow tower computing device 22. The memory component 30*a* may store, for example, operating logic 28, the systems logic 32A, and the crop logic 32B. The operating logic 28, the systems logic 32A and the crop logic 32B may each include a plurality of different pieces of logic, each of which may be embodied as a computer program, firmware, and/or hardware, as an example.

The operating logic 28 may include an operating system and/or other software for managing components of the modular grow tower computing device 22. As discussed above, the systems logic 32A and the crop logic 32B may reside in the memory component 30*a* and may be configured to perform the functionality, as described above. In some embodiments, the systems logic 32A and the crop logic 32B may reside on different computing devices. As an example, one or more of the functionalities and/or components described herein may be provided by a user computing device and/or remote computing device. While the modular grow tower computing device 22 is illustrated with the systems logic 32A and the crop logic 32B as separate logical components, this is only an example. In some embodiments, a single piece of logic (and/or or several linked modules) may cause the modular grow tower computing device 22 to provide the described functionality.

The processor 12 may include any processing component operable to receive and execute instructions (such as from the data storage component 18 and/or the memory component 30*a*). Illustrative examples of the processor 12 include, but are not limited to, a computer processing unit (CPU), a many integrated core (MIC) processing device, an accelerated processing unit (APU), a digital signal processor (DSP). In some embodiments, the processor 12 may be a plurality of components that function together to provide processing capabilities, such as integrated circuits (including field programmable gate arrays (FPGA)) and the like.

In various embodiments, the processor and/or other components of the tower computing device can monitor and measure sensor data, growth parameters, or other environmental factors, such as, but not limited to, temperature, humidity, light intensity, light duration, light spectrum, water quality/purity, water quantity, watering frequency, water temperature, water polarization, water flow rate, water filtration system efficiency, water mineral content, nutrient concentration, nutrient composition, pH level, airflow, $CO_2$ concentration, soil type, soil moisture, soil pH, soil composition, tray size and shape, tray material, growth medium, plant density, genetic factors, pollination, growth stage, harvest timing, microbial activity, oxygen levels, feeding frequency (for insects and larvae), substrate type (for fungus), light-dark cycles, movement frequency, sound vibrations, structural support (stakes, netting, cages, trellis, etc.), climatic conditions, altitude/barometric pressure, cleaning/washing/sanitizing/hygiene practices, growth hormones, symbiotic relationships if different crops are mixed, different crop or seed varieties in one tray, amount of human contact, pre-planting treatments or coatings applied to seeds, crop harvest weight, crop color, crop uniformity, crop density, crop level, nutrient content of crop harvests, and/or elemental analysis of crop harvests.

Additional factors that can be measured and/or used to customize tower operations include cart paths, cart maintenance reports, total electricity use, total water use, total seed or crop-starting material amount or weight, total time of carts in motion, total downtime of no motion, maintenance history, usage history, change history, video monitoring of individual systems, video monitoring of facility, user logs, software update history, bug reports, weather, and/or user notes.

The input/output hardware 14 may include and/or be configured to interface with microphones, speakers, a display, and/or other hardware. That is, the input/output hardware 14 may interface with hardware that provides a user interface or the like. For example, a user interface may include a graphical user interface (GUI) comprising various interactive elements such as buttons, menus, display graphs, icons, sliders, and text fields. The GUI is designed to facilitate easier user interaction with the system, providing visual representations of data and controls to improve the overall usability and efficiency of the system. The graphical elements may be arranged in a layout that is intuitive and accessible, allowing users to navigate the interface and perform desired actions with improved case.

The network interface hardware 16 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the modular grow tower computing device 22 and other computing devices, such as a user computing device, a remote computing device, and/or other devices.

The data storage component 18 may generally be any medium that stores digital data, such as, for example, a hard disk drive, a solid state drive (SSD), a compact disc (CD), a digital versatile disc (DVD), a Blu-Ray disc, and/or the like. It should be understood that the data storage component 18 may reside local to and/or remote from the modular grow tower computing device 22 and may be configured to store one or more pieces of data and selectively provide access to the one or more pieces of data.

It should be understood that while the components in FIG. 7 are illustrated as residing within the modular grow tower computing device 22, this is merely an example. In some embodiments, one or more of the components may reside external to the modular grow tower computing device 22. It should also be understood that, while the modular grow tower computing device 22 is illustrated as a single device, this is also merely an example. That is, the modular grow tower computing device 22 may represent a plurality of devices that are communicatively coupled to one another and provide the functionality described herein.

Additionally, while the modular grow tower computing device 22 is illustrated with the various logic components (e.g., the operating logic 28, the systems logic 32A, and the crop logic 32B) and data components (e.g., the systems data 24A and the crop data 24B) as separate components, this is also an example. In some embodiments, a single piece of logic (and/or a plurality of linked modules) and/or a single data component (and/or a plurality of linked modules) may also cause the modular grow tower computing device 22 to provide the functionality described herein.

Similarly, while the modular grow tower computing device 22 is depicted in a "PC" environment, it should be understood that at least some embodiments may not be limited in this way. Specifically, some embodiments may be configured such that the modular grow tower computing device 22 is configured as and/or includes a programmable logic controller (PLC) and/or other computing infrastructure.

While particular embodiments and aspects of the present disclosure have been illustrated and described herein, various other changes and modifications can be made without departing from the scope of the disclosure. Moreover, although various aspects have been described herein, such aspects need not be utilized in combination. Accordingly, it is therefore intended that the appended claims cover all such changes and modifications that are within the scope of the embodiments shown and described herein. It should also be understood that the embodiments described herein are merely exemplary and are not intended to limit the scope of this disclosure.

What is claimed is:

1. A system for coupling a plurality of carts in a modular grow tower, the system comprising:

a plurality of body frames positioned vertically, each body frame including a plurality of tracks;

a plurality of carts configured to traverse the tracks, each cart including a tray to support a quantity of crops and a plurality of wheels for traversing the tracks, each cart having a first end with at least one male engagement mechanism and a second end with at least one female engagement mechanism, wherein the male engagement mechanism of a first cart is configured to engage the female engagement mechanism of a second cart in a removable manner, wherein the male engagement mechanism of the first cart and the female engagement mechanism of the second cart are configured to automatically disengage when the first cart is acted upon by a lift mechanism in an upward vertical direction;

a plurality of lift frames located at opposite ends of the body frames, each lift frame comprising a plurality of lift mechanisms configured to move the carts in a vertical direction between the tracks of the body frames, wherein the plurality of lift mechanisms are further configured to decouple the carts by moving the carts in a downward vertical direction;

a first plurality of translating mechanisms having a motorized movable arm with a latch, the first plurality of translating mechanisms being positioned along the tracks of the body frames, each translating mechanism configured to move the carts in a longitudinal direction along the tracks of the body frames as a coupled group by latching onto one of the plurality of carts and actuating between an extended position and a retracted position of the translating mechanism;

a second plurality of translating mechanisms having a movable arm with a latch, the second plurality of translating mechanisms being positioned adjacent to the plurality of lift frames, each of the second plurality of translating mechanisms configured to pull one of the plurality of carts from an adjacent lift frame onto the plurality of tracks of a body frame or push one of the plurality of carts from the body frame onto the adjacent body frame by latching onto one of the plurality of carts and actuating between an extended position and a retracted position of the translating mechanism;

a modular grow tower computing device configured to control an operation of the body frames, lift frames, first and second translating mechanisms, cart path, cart movement, and crop growth conditions.

2. The system of claim 1, wherein the tracks are configured to support the carts such that the carts traverse the tracks in a moving path either coupled as groups in unison and/or individually from a top end to a bottom end of the modular grow tower.

3. The system of claim 2, wherein the moving path comprises a serpentine moving path.

4. The system of claim 2, wherein the moving path comprises a C-shaped moving path.

5. The system of claim 2, wherein the moving path skips rows of tracks in the modular grow tower in an alternating pattern.

6. The system of claim 1, wherein each track of the body frames includes a plurality of track floors spaced apart in a vertical direction, the carts being configured to engage with the tracks and traverse in a longitudinal direction while being restricted from lateral movement.

7. The system of claim 1, wherein the first plurality of translating mechanisms are positioned along a length of each track.

8. A method for coupling a plurality of carts in a modular grow tower, the method comprising:

positioning a plurality of body frames vertically, each body frame having a plurality of tracks;

configuring a plurality of carts to traverse the tracks, each cart including a tray to support a quantity of crops and a plurality of wheels for traversing the tracks, each cart having a first end with at least one male engagement mechanism and a second end with at least one female engagement mechanism;

engaging the male engagement mechanism of a first cart with the female engagement mechanism of a second cart in a downward vertical direction;

utilizing a plurality of lift frames located at opposite ends of the body frames, each lift frame having a plurality of lift mechanisms to move the carts in a vertical direction between the tracks of the body frames;

utilizing a first plurality of translating mechanisms having a motorized movable arm with a latch, the first plurality of translating mechanisms having a motorized movable arm with a latch, the first plurality of translating mechanisms being positioned along the tracks of the body frames, each translating mechanism configured to move the carts in a longitudinal direction along the tracks of the body frames as a coupled group by latching onto one of the plurality of carts and actuating between an extended position and a retracted position of the translating mechanism;

decoupling the carts by moving the carts in a vertical direction, wherein the male engagement mechanism of the first cart and the female engagement mechanism of the second cart are configured to automatically disengage when the first cart is acted upon by a lift mechanism in an upward vertical direction; and utilizing a second plurality of translating mechanisms having a movable arm with a latch, the second plurality of translating mechanisms being positioned adjacent to the plurality of lift frames, each of the second plurality of translating mechanisms configured to pull one of the plurality of carts from an adjacent lift frame onto the plurality of tracks of a body frame or push one of the plurality of carts from the body frame onto the adjacent body frame by latching onto one of the plurality of carts and actuating between an extended position and a retracted position of the translating mechanism;

controlling an operation of the body frames, lift frames, lift mechanisms, first and second translating mechanisms, cart path, cart movement, and crop growth conditions, and carts with a modular grow tower computing device.

9. The method of claim 8, further comprising moving the carts in a serpentine moving path from a top end to a bottom end of the modular grow tower.

10. The method of claim 9, wherein the moving path comprises a C-shaped moving path.

11. The method of claim 9, wherein the moving path skips rows of tracks in the modular grow tower in an alternating pattern.

12. The method of claim 8, wherein each track of the body frames includes a plurality of track floors spaced apart in a vertical direction, and the carts are configured to engage with the tracks and traverse in a longitudinal direction while being restricted from lateral movement.

13. The method of claim 8, wherein the first plurality of translating mechanisms are positioned along a length of each track.

14. The method of claim 8, wherein each cart has a plurality of wheels configured to engage the tracks.

15. The method of claim 8, wherein the male engagement mechanism comprises a protrusion and the female engagement mechanism comprises a notch.

16. The system of claim 1, wherein the male engagement mechanism comprises a protrusion and the female engagement mechanism comprises a notch.

17. The system of claim 16, wherein the male engagement mechanism comprises a triangular protrusion and the female engagement mechanism comprises a triangular notch.

* * * * *